US008231476B2

(12) United States Patent
Kakimoto et al.

(10) Patent No.: US 8,231,476 B2
(45) Date of Patent: Jul. 31, 2012

(54) YOKE FOR UNIVERSAL JOINT

(75) Inventors: Kazuhide Kakimoto, Yao (JP); Seijyun Inoue, Yao (JP); Takeshi Koyama, Yao (JP)

(73) Assignee: Koyo Machine Industries Co., Ltd., Yao-shi, Osaka (JP)

( * ) Notice: Subject to any disclaimer, the term of this patent is extended or adjusted under 35 U.S.C. 154(b) by 428 days.

(21) Appl. No.: 12/376,104

(22) PCT Filed: Aug. 2, 2006

(86) PCT No.: PCT/JP2006/315266
§ 371 (c)(1),
(2), (4) Date: Nov. 30, 2009

(87) PCT Pub. No.: WO2008/015741
PCT Pub. Date: Feb. 7, 2008

(65) Prior Publication Data
US 2010/0069163 A1    Mar. 18, 2010

(51) Int. Cl.
*F16D 3/40* (2006.01)

(52) U.S. Cl. .................. 464/135; 464/182

(58) Field of Classification Search ............ 464/134, 464/135, 182; 403/290, 359.5; 24/279
See application file for complete search history.

(56) References Cited

U.S. PATENT DOCUMENTS

| 1,553,081 | A | * | 9/1925 | Humes ..................... 24/279 |
| 6,575,658 | B2 | * | 6/2003 | Daniel et al. ............ 464/134 X |
| 7,513,709 | B2 | * | 4/2009 | Shimada et al. ......... 464/134 X |
| 2001/0012470 | A1 | | 8/2001 | Ikeda |

FOREIGN PATENT DOCUMENTS

| JP | 59-121229 A | * | 7/1984 |
| JP | 7-317793 A | | 12/1995 |
| JP | 10-9277 A | | 1/1998 |
| JP | 2001-221244 A | | 8/2001 |

* cited by examiner

*Primary Examiner* — Gregory Binda
(74) *Attorney, Agent, or Firm* — Smith Patent Office

(57) ABSTRACT

A yoke 1 for universal joint of the present invention comprises: an insertion portion 11 which is formed in cylindrical shape opening along an axial direction of a rotating shaft and into which the one end side of the rotating shaft is inserted; a first tightening portion 13 and the second tightening portion 14 being a pair of tightening portions 12 which is extended from the insertion portion 11 so as to face each other with the opening of the insertion portion 11 between them; and a bolt 16 and nut 17 for tightening the pair of tightening portions 12 from either outside thereof, and the pair of tightening portions 12 is tightened, thereby the rotating shaft inserted into the insertion portion 11 is held and fixed. The bolt 16 is inserted into a through hole 13a of the first tightening portion 13. The nut 17 is fitted into a through hole 14a of the second tightening portion 14 so as to engage with the second tightening portion 14, and is formed so that at least a part of the end surface on the side facing the first tightening portion 13 is extended toward the first tightening portion 13 side and a gap S between them is a predetermined gap.

2 Claims, 7 Drawing Sheets

YOKE FOR UNIVERSAL JOINT

TECHNICAL FIELD

The present invention relates to a yoke for universal joint to which one end side of a rotating shaft is connected.

BACKGROUND ART

A universal joint 100 is for connecting two shafts, the axes of which cross each other at a certain angle, and transmitting a rotational force of the one shaft to the other shaft. For example, as shown in FIG. 9, the universal joint 100 is configured with: a cross shaft 101, the axes of which are perpendicular to each other; and two yokes 102 and 105 (a first yoke 102 and a second yoke 105) which are each connected to both end portions of each of the shafts configuring the cross shaft 101 and arranged pivotably about these axes, and to which one end sides of rotating shafts 111 and 112 are connected, respectively.

Such a universal joint 100 is provided on a steering device for an automobile or the like, for example. This steering device is configured to give a steering angle to front wheels by transmitting a rotational force of a steering shaft 111 which is rotated by operating a steering wheel to an input shaft 112 of a steering gear via the universal joint 100.

The first yoke 102 comprises: a base portion 103; and a pair of opposed walls 104 which is extended from the base portion 103 so as to face each other at a distance. The one end side of the steering shaft 111 is fixedly provided on the outer surface of the base portion 103, and the cross shaft 101 is mounted to the inner surfaces of the distal end side of the opposed walls 104.

The second yoke 105, as shown in FIG. 9 to FIG. 11, comprises: an insertion portion 106 formed in a cylindrical shape having an opening 106a which opens along the axial direction of the input shaft 112 of the connected steering gear, the insertion portion 106, the inner circumferential surface of which comes into contact with the outer circumferential surface of the input shaft 112 when the one end side of the input shaft 112 is inserted thereinto, and; a pair of tightening portions 107 which is extended from the side of the joint with the insertion portion 106 to the opposite side thereof so as to face each other with the opening 106a of the insertion portion 106 between them; a pair of opposed walls 108 which is extended toward the opposite side to the connection with the input shaft 112 and along the axial direction of the input shaft 112, and which is arranged to face each other at a distance; and a bolt 109 for tightening the pair of tightening portions 107.

A serration 106b which can engage with a serration 112a formed on the outer circumferential surface of the one end side of the input shaft 112 is formed on the inner circumferential surface of the insertion portion 106. A through hole 107a is formed in one of the pair of tightening portions 107, and a screw hole 107b is formed in the other co-axially with the though hole 107a. The bolt 109 is inserted into the through hole 107a and screwed into the screw hole 107b. A mounting hole 108a in which the cross shaft 101 is mounted is co-axially formed in each of the distal end portion of the pair of opposed walls 108.

According to this second yoke 105, after the one end side of the input shaft 112 is inserted into the insertion portion 106, when the pair of tightening portions 107 is tightened by the bolt 109 which is inserted into the through hole 107a and screwed into the screw hole 107b, the input shaft 112 is held and fixed by the insertion portion 106. Thereby, the second yoke 105 and the input shaft 112 are connected and fixed.

At the one end side of the input shaft 112, an annular groove 112b is formed. By the engagement between the groove 112b and the outer circumferential portion of the bolt 109, the movement of the input shaft 112 in the axial direction thereof is regulated. Thereby, the input shaft 112 is prevented from coming out of the second yoke 105.

In the above described second yoke 105, when the pair of tightening portions 107 is tightened by the bolt 109, as shown in FIG. 11, the distal end sides of the tightening portions 107 are deformed so that they approach each other and the bolt 109 bend. Therefore, not only tensile stress but also bending stress acts on the bolt 109, thereby, causing a problem that fatigue strength (durability) of the bolt 109 is decreased. That is, when a force by the rotational force transmitted via the universal joint 100 acts on the bolt 109 repeatedly in a state where the tensile stress and the bending stress act thereon, the time until the bolt is broken with fatigue is remarkably shortened.

As a yoke (second yoke 105) which appears to be able to remove such convenience, conventionally, there is the yoke disclosed in Japanese Unexamined Patent Application Publication No. 7-317793, for example. Similarly to the second yoke 105, this yoke 120 comprises: the insertion portion 106; the pair of tightening portions 107; the pair of opposed walls 108; and a bolt 109 and nut 121 for tightening the pair of tightening portions 107. The same components as the second yoke 105 are assigned the same reference numerals, and detailed explanations thereof are omitted.

On the other of the pair of tightening portions 107, a through hole 107c is formed instead of the screw hole 107b. The pair of tightening portions 107 is tightened by the bolt 109 and the nut 121 which are inserted into the through holes 107a and 107c. Thereby, the input shaft 112 is held and fixed by the insertion portion 106.

At distal end of the pair of tightening portions 107, contact portions 107d which are extended toward the facing direction of the tightening portions 107, and which can come into contact with each other. When tightened by the bolt 109 and nut 121, these contact portions 107d come into contact with each other. Thereby, the distal end sides of the tightening portions 107 are prevented from approaching each other.

Patent document 1: Japanese Unexamined Patent Application Publication No. 7-317793.

DISCLOSURE OF INVENTION

Problem Invention is to Solve

In the above conventional yoke 120 disclosed in the Japanese Unexamined Patent Application Publication No. 7-317793, as described above, when tightened by the bolt 109 and the nut 121, the distal end sides of the tightening portions 107 are prevented by the contact of the contact portions 107d from being deformed so that they approach. However, because the position of the contact between both contact portions 107d and the position of the tightening by the bolt 109 and the nut 121 are away from each other, the joints of the insertion portion 106 side of the tightening portions 107, as shown in FIG. 13, are deformed so that they approach each other. Further, although not specifically shown in the drawings, the center portions of the tightening portions 107 are deformed so that they bend. Therefore, it is impossible to completely prevent the bolt 109 from bending.

Therefore, also in the yoke 120, similarly to the case of the second yoke 105, not only tensile stress but also bending stress acts the bolt 109 due to the deformation thereof. As a result, the durability of the bolt 109 is reduced.

Further, the shape of the tightening portion 107 becomes complex with the contact portion 107d formed. Therefore, there are problems that molding becomes difficult, that the number of molding processes is increased, and that the shape of a molding die becomes complex. Further, there is also a problem that the manufacturing cost increases because molding becomes difficult, the number of molding processes is increased, and the shape of a molding die becomes complex.

The present invention has been achieved in view of the above-described circumstances, and an object thereof is to provide a yoke for universal joint with which it is possible to increase the durability of the bolt by preventing the pair of tightening portions and the bolt from being deformed, and also with which it is possible to facilitate molding, to reduce the number of molding processes, to simplify the shape of a molding die and to reduce the manufacturing cost.

Means for Resolving the Problem

To achieve the above-described object, the present invention relates to a yoke for universal joint to which one end side of a rotating shaft is connected.

This yoke for a universal joint comprises: an insertion portion formed in a U-shape or a cylindrical shape having an opening which opens along an axial direction of the connected rotating shaft, the insertion portion, an inner circumferential surface of which comes into contact with an outer circumferential surface of the rotating shaft when the one end side of the rotating shaft is inserted thereinto; a first tightening portion and a second tightening portion being a pair of tightening portions which is extended from the insertion portion so as to face each other with the opening of the insertion portion between them; and a bolt and nut which tightens the pair of tightening portions from either outside thereof, and the tightening portions are tightened by the bolt and nut to thereby hold and fix the rotating shaft inserted into the insertion portion.

A through hole penetrating to the facing direction of the pair of the tightening portions is co-axially formed in each of the first tightening portion and second tightening portion, and the bolt is inserted into the through hole of the first tightening portion and the nut is fitted into the through hole of the second tightening portion so as to engage with the second tightening portion.

Further, a part of an end surface on the side facing the first tightening portion of the nut is extended toward the first tightening portion side.

A predetermined gap is formed between the end surface of the nut and the first tightening portion before the tightening portions are tightened by the bolt and nut, and the end surface of the nut and the first tightening portion come into contact with each other when the tightening portions are tightened by the bolt and nut.

According to the present invention, when the one end side of the rotating shaft is inserted into the insertion portion and the pair of tightening portions is tightened by the bolt and nut, the rotating shaft is held by the insertion portion, and the yoke and the rotating shaft are connected and fixed. Further, at this time, a part of the end surface of the nut on the side facing the first tightening portion comes into contact with the first tightening portion, thereby, the bolt is prevented from bending because of being deformed so that the pair of tightening portions approaches each other.

In the present invention, a part of the end surface of the nut on the side facing the first tightening portion is extended to the first tightening portion side and formed to come into contact with the first tightening portion. Therefore, compared with the conventional one, it is possible to prevent the approach (deformation) of the pair of tightening portion at the portion nearest to the position of the tightening by the bolt and nut. Thereby, the bending stress acting the bolt can be reduced as much as possible by preventing the bolt from bending. As a result, it is possible to increase the durability of the bolt.

Further, compared with the conventional yoke in which the pair of tightening portions is provided with the contact portions, it is possible to simplify the shape thereof. Therefore, it is possible to simplify molding, to reduce the number of molding processes, and to simplify the shape of a molding die. In addition, it is possible to keep the manufacturing cost low by simplifying molding, reducing the number of molding processes, and simplifying the shape of a molding die.

The yoke for universal joint may have a configuration in which an annular contact member is fitted into the through hole of the first tightening portion so as to engage with the first tightening portion and the nut is fitted into the through hole of the second tightening portion so as to engage with the second tightening portion, the bolt is inserted into the contact member, and the contact member is arranged to be positioned between a head of the bolt and the nut. In this case, at least a part of an end surface on the side facing the first tightening portion of the nut is extended toward the first tightening portion side, at least a part of an end surface on the side facing the nut of the contact member is extended toward the nut side, a predetermined gap is formed between the end surface of the contact member and the end surface of the nut before the tightening portions are tightened by the bolt and nut, and the end surface of the contact member and the end surface of the nut come into contact with each other when the tightening portions are tightened by the bolt and nut. Also in this way, by bringing the nut and the contact member into contact, it is possible to effectively prevent the bolt from bending because of being deformed so that the pair of tightening portions approaches when tightened by the bolt and nut. Further, it is possible to facilitate molding, to reduce the number of molding processes, to simplify the shape of a molding die, and to reduce the manufacturing cost.

Effects of the Invention

Thus, according to the yoke for universal joint of the present invention, the pair of tightening portions is prevented from being deformed by means of bringing the nut and the first tightening portion into contact, or bringing the nut and the contact member into contact. And, the bending stress acting the bolt can be reduced as much as possible by preventing the bolt from being deformed. Thereby, the durability of the bolt can be increased. Further, by simplifying the shape of the pair of the tightening portions, it is possible to simplify molding, to reduce the number of molding processes, to simplify the shape of a molding die, and to keep the manufacturing cost low.

LEGEND

Figure 1:
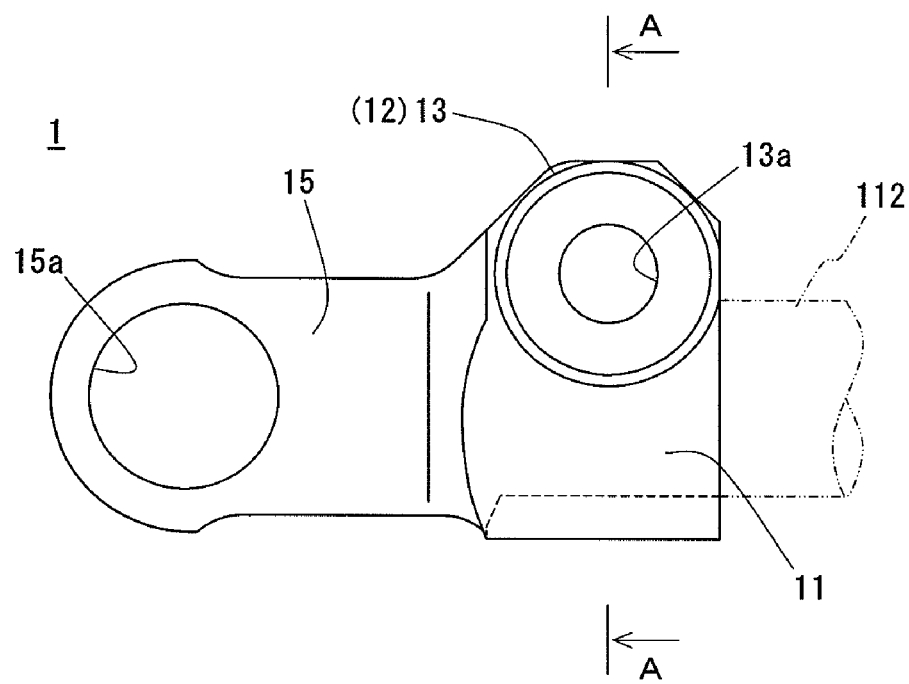
FIG. 1 is a front view showing a schematic configuration of a yoke for universal joint according to one embodiment of the present invention.

1 Yoke for universal joint (Second yoke)
11 Insertion portion
12 A pair of tightening portions
13 First tightening portion
14 Second tightening portion
15 A pair of opposed walls
16 Bolt
17 Nut

BEST MODE FOR CARRYING OUT THE INVENTION

Figure 2:
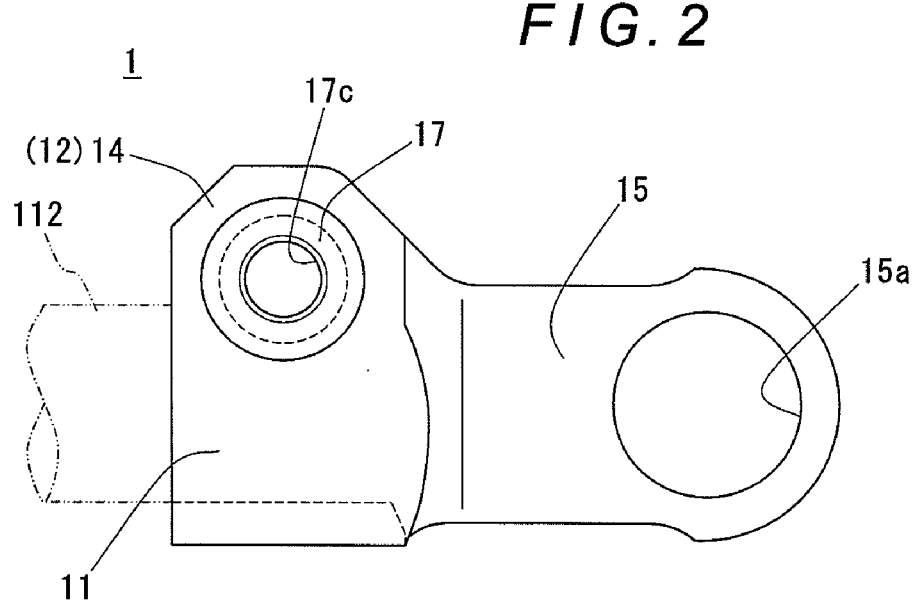
FIG. 2 is a rear view showing a schematic configuration of the yoke for universal joint according to the embodiment.
Figure 3:
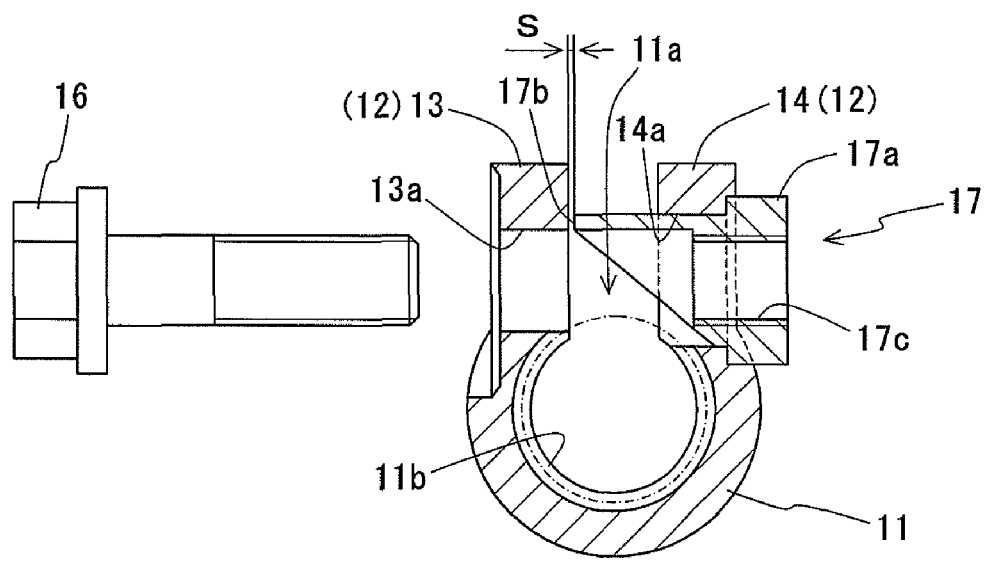
FIG. 3 is a cross-sectional view taken along line A-A in FIG. 1.
Figure 4:
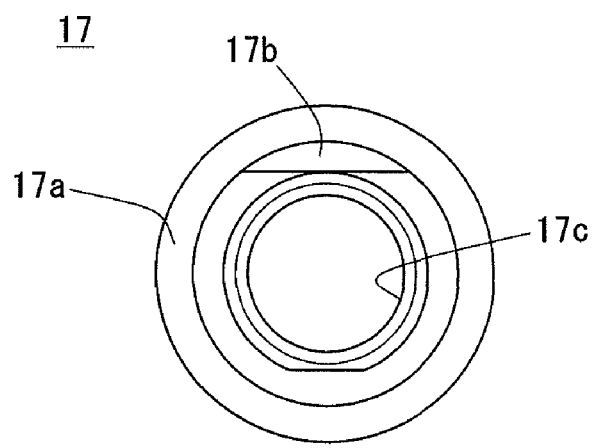
FIG. 4 is a side view showing a schematic configuration of a nut according to the embodiment.
Figure 9:
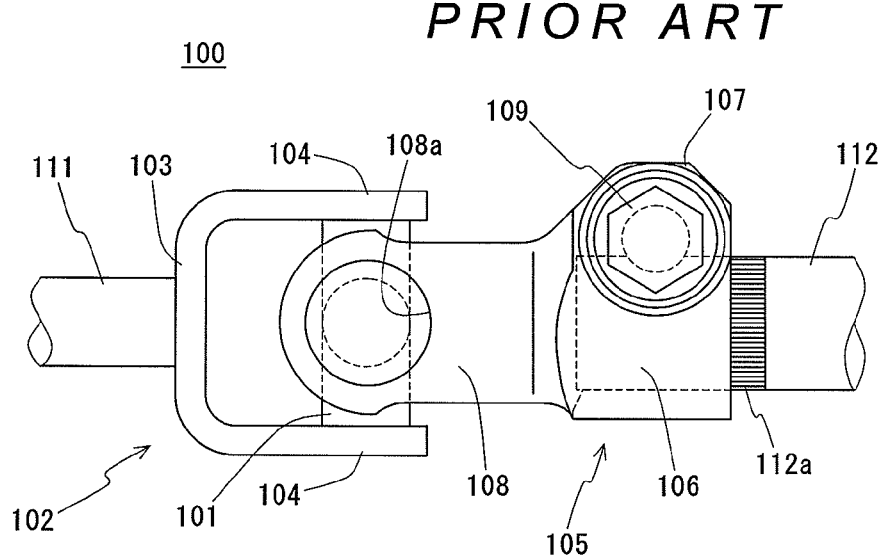
FIG. 9 is a front view showing a schematic configuration of a yoke for universal joint and other components according to the prior art.
Figure 10:
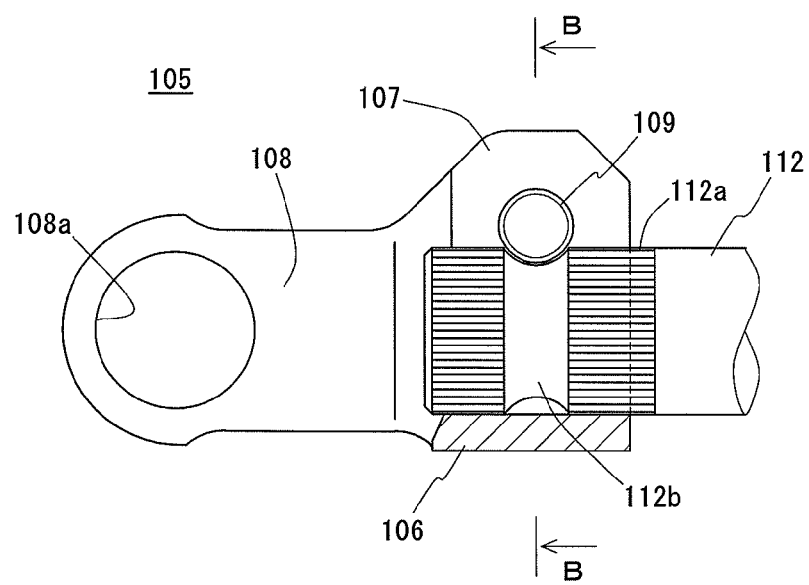
FIG. 10 is a cross-sectional view showing a schematic configuration of the yoke for universal joint and other components according to the prior art.
Figure 11:
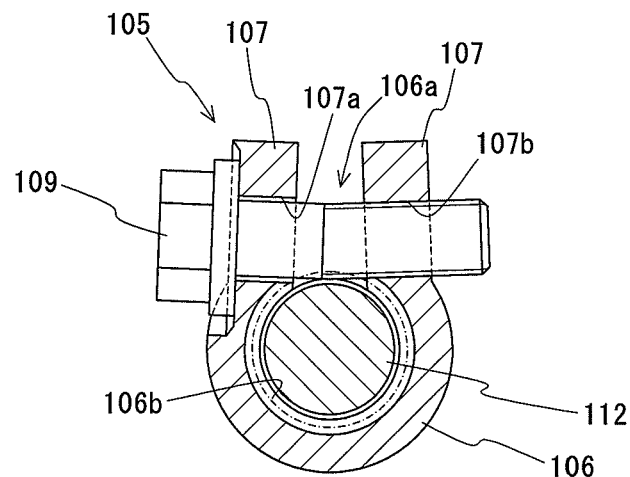
FIG. 11 is a cross-sectional view taken along line B-B in FIG. 10.
Figure 12:
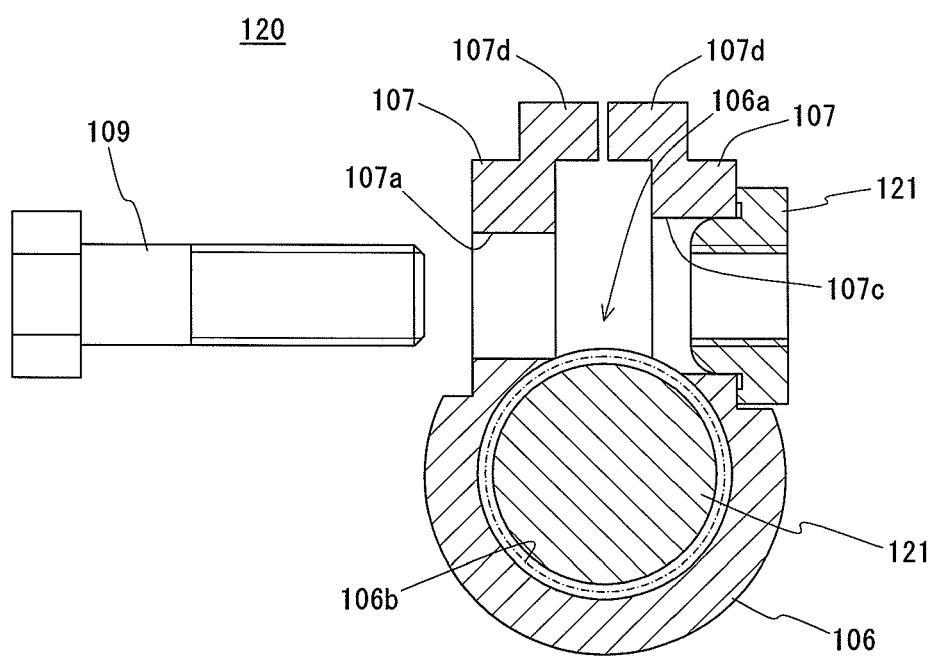
FIG. 12 is a cross-sectional view showing a schematic configuration of the yoke for universal joint and other components according to the prior art.
Figure 13:
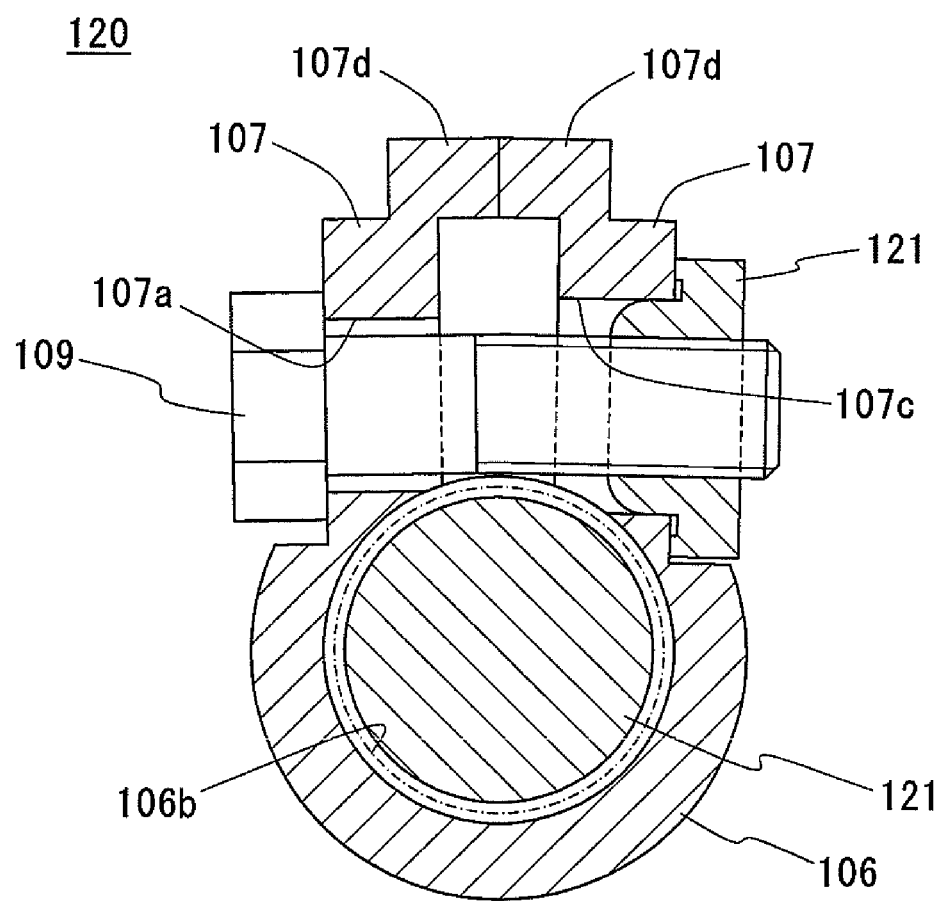
FIG. 13 is a cross-sectional view showing a state of being tightened by a bolt and nut.

Hereinafter, an explanation will be given to a specific embodiment of the present invention with the reference to the accompanying drawings. FIG. 1 is a front view showing a schematic configuration of a yoke for universal joint according to one embodiment of the present invention, and FIG. 2 is a rear view showing a schematic configuration of the yoke for universal joint of the embodiment. FIG. 3 is a cross-sectional view taken along line A-A in FIG. 1, and FIG. 4 is a side view showing a schematic configuration of a nut according to the embodiment. Further, in the explanation described below, the yoke 1 for universal joint of the embodiment shown in FIG. 1 to FIG. 4 shall be provided instead of the second yoke 105 shown in FIG. 9 to FIG. 11. And, components other than the yoke 1 are assigned the same reference numerals as the above, and detailed explanations thereof are omitted.

As shown in FIG. 1 to FIG. 4, the yoke 1 for universal joint (second yoke) comprises: an insertion portion 11 formed in a cylindrical shape having an opening 11a which opens along an axial direction of an input shaft 112, the insertion portion, an inner circumferential surface of which comes into contact with an outer circumferential surface of the input shaft 112 when the one end side of the input shaft 112 is inserted thereinto; a first tightening portion 13 and a second tightening portion 14 being a pair of tightening portions 12 which is extended from the side of the joint with the insertion portion 11 to the opposite side thereof so as to face each other with the opening 11a of the insertion portion 11 between them; a pair of opposed walls 15 which is extended from the insertion portion 11 toward the opposite side to the side of the connection with the input shaft 112 and along the axial direction of the input shaft 112, and which is arranged to face each other at a distance; and a bolt 16 and nut 17 for tightening the pair of tightening portions 12 from either outside thereof.

On the inner circumferential surface of the insertion portion 11, a serration 11b which can engage with a serration 112a formed on the outer circumferential surface of the one end side of the input shaft 112 is formed. Through holes 13a and 14a penetrating in the facing direction thereof are formed co-axially in the first tightening portion 13 and the second tightening portion 14, respectively. The bolt 16 is inserted into the through hole 13a, and the nut 17 is fitted into the through hole 14a so as to engage with the second tightening portion 14. Mounting holes 15a in which a cross shaft 101 is mounted are formed co-axially in the distal end portions of the pair of opposed walls 15.

The nut 17 is formed in a stepped shape having an enlarged-diameter portion 17a which can engage with the second tightening portion 14, and is formed so that a part 17b of the end surface (distal end surface) thereof on the side facing the first tightening portion 13 protrudes from the through hole 14a toward the first tightening portion 13 side and a gap S between them is a predetermined gap (for example, approximately 1 mm). The distal end surface 17b of the nut 17 is adapted to come into the contact with the first tightening portion 13 when the pair of tightening portions 12 is tightened.

A screw hole 17c which is formed in the nut 17 into which the bolt 16 is screwed is provided so that the depth thereof is greater than the thickness of the second tightening portion 14. In this way, by making the depth of the screw hole 17c greater than the thickness of the second tightening portion 14, it is possible to sufficiently secure the length of the screw portion. Therefore, it is possible to enhance the strength of the screw portion (female screw).

In the second yoke 1, the shape of the body can be obtained by forming the serration 11b, the through holes 13a and 14a, and the mounting holes 15a by means of cutting process after performing press working such as cold press or hot press on a plate-like member and molding the member in a desired shape having the insertion portion 11, the pair of tightening portions 12 and the pair of opposed walls 15. However, it is not limited thereto, and any manufacturing method may be employed.

In the second yoke 1 according to the embodiment configured as described above, when the one end side of the input shaft 112 is inserted into the insertion portion 11 and the pair of tightening portions 12 is tightened by the bolt 16 and nut 17, the input shaft 112 is held and fixed by the insertion portion 11. Thereby, the second yoke 1 and the input shaft 112 is connected and fixed.

Figure 5:
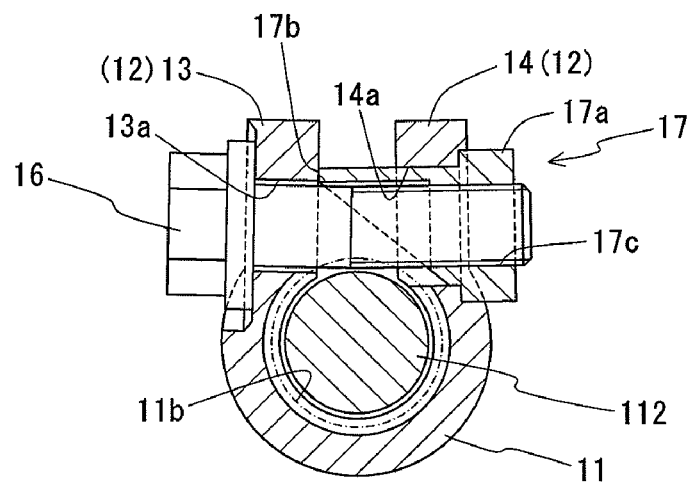
FIG. 5 is a cross-sectional view showing a state of being tightened by a bolt and nut.

Further, at this time, as shown in FIG. 5, the distal end surface 17b of the nut 17 comes into contact with the first tightening portion 13. Thereby, the bolt 16 is prevented from bending because of being deformed so that the pair of tightening portions 12 approaches each other.

In this way, according to the second yoke 1 of the embodiment, because the distal end surface 17b of the nut 17 is adapted to come into contact with the first tightening portion 13 by being extended toward the first tightening portion 13 side, it is possible to prevent the approach (deformation) of the pair of tightening portions 12 at the portion nearer to the position of the tightening by the bolt 16 and nut 17 than the conventional one. Thereby, the bending stress acting the bolt 16 can be reduced as much as possible by preventing the bolt 16 from bending. As a result, it is possible to increase the durability of the bolt 16.

Further, compared with the conventional yoke 120 in which the pair of tightening portions 107 is provided with the contact portions 107d, it is possible to simplify the shape thereof. Therefore, it is possible to simplify molding, to reduce the number of molding processes, and to simplify the shape of a molding die. In addition, it is possible to keep the manufacturing cost low by simplifying molding, reducing the number of molding processes, and simplifying the shape of a molding die.

Thus, one embodiment of the present invention has been described above. However, specific modes in which the present invention can be realized are not limited thereto.

Figure 6:
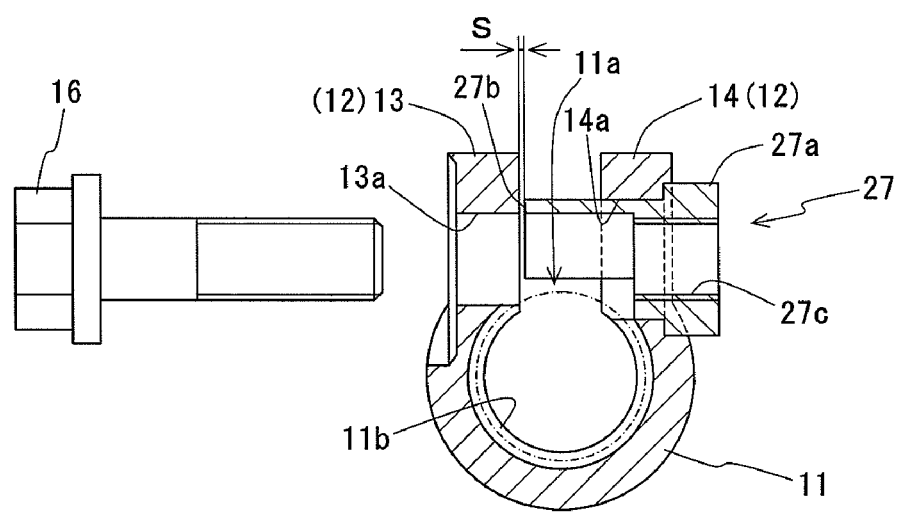
FIG. 6 is a cross-sectional view showing a schematic configuration of a yoke for universal joint according to another embodiment of the present invention.
Figure 7:
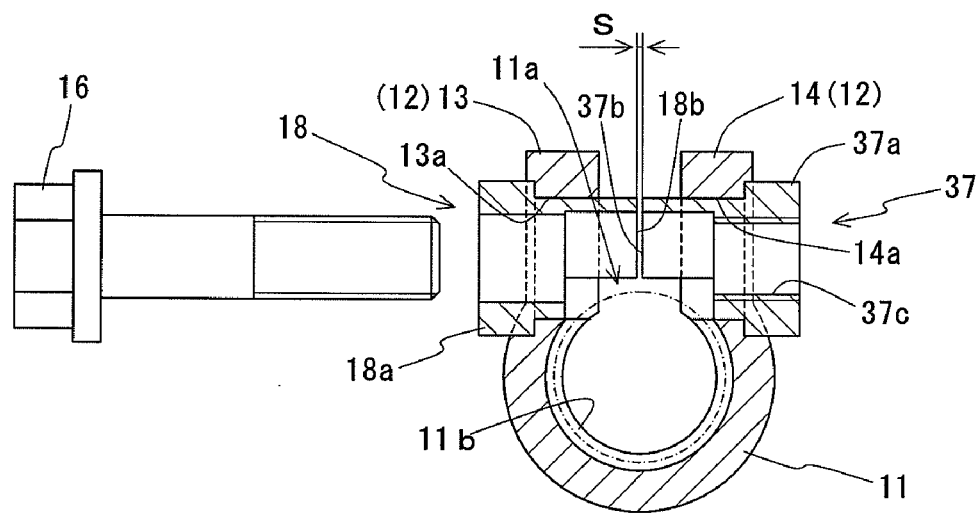
FIG. 7 is a cross-sectional view showing a schematic configuration of a yoke for universal joint according to another embodiment of the present invention.

The shape of the nut 17 is not limited to the shape shown in FIG. 3 and FIG. 4, and may be formed in the shape shown in FIG. 6 or FIG. 7, for example. A nut 27 shown in FIG. 6 is formed so that an end surface (distal end surface) 27b on the side facing the first tightening portion 13 thereof is formed in an arc, and the curvature radius of the arc portion is larger than the curvature radius of the through hole 13a. Also when the nut 27 is formed in this way, a similar effect to the above can be obtained. It is noted that an enlarged-diameter portion 27a and a screw hole 27c have the same configuration as the enlarged-diameter portion 17a and the screw hole 17c, respectively.

A nut 37 shown in FIG. 7 is formed so that the amount of protrusion of a distal end surface 37b is smaller than the amount shown in FIG. 3, FIG. 4 and FIG. 6. And an annular contact member 18 into which the bolt 16 is inserted is fitted into the through hole 13a of the first tightening portion 13 so as to engage with the first tightening portion 13. This contact member 18 is formed in an stepped shape having an enlarged-diameter portion 18a which can engage with the first tightening portion 13 and so that the end surface (distal end surface) 18b on the side facing the nut 37 protrudes from the through hole 13a toward the nut 37 side and the gap S between them is a predetermined gap (for example, approximately 1 mm) between them. Further, the distal end surface 18b of the contact member 18 is formed in an arc having approximately the same shape as the distal end surface of the nut 37, and is arranged so that the distal end surface 18b of the contact member 18 and the distal end surface 37b of the nut 37 are able to come into contact with each other when the pair of tightening portions 12 is tightened. It is noted that an enlarged-diameter portion 37a and a screw hole 37c have the same configuration as the enlarged-diameter portion 17a and the screw hole 17c, respectively.

In this way, also when the nut 37 and the contact member 18 are adapted to come into contact with each other, it is possible to prevent the pair of tightening portions 12 from being deformed so that they approach each other when tightened, at the portion nearest to the position of the tightening by the bolt 16 and nut 37. Thereby, similarly to the above, it is possible to prevent the bolt 16 from bending. As a result, it is possible to reduce the bending stress acting the bolt 16 as much as possible and to increase the durability of the bolt 16. Further, the shape thereof is simple, thereby it is possible to simplify molding, reduce the number of molding processes, simplify the shape of a molding die, and keep the manufacturing cost low.

In the above embodiments, the second yoke 1 having the cylindrical insertion portion 11 has been explained as an example. However, the shape of the insertion portion 11 is not limited to a cylindrical shape. For example, as shown in FIG. 8, the present invention can be applied to a second yoke 2 having a U-shaped insertion portion 51.

Figure 8:
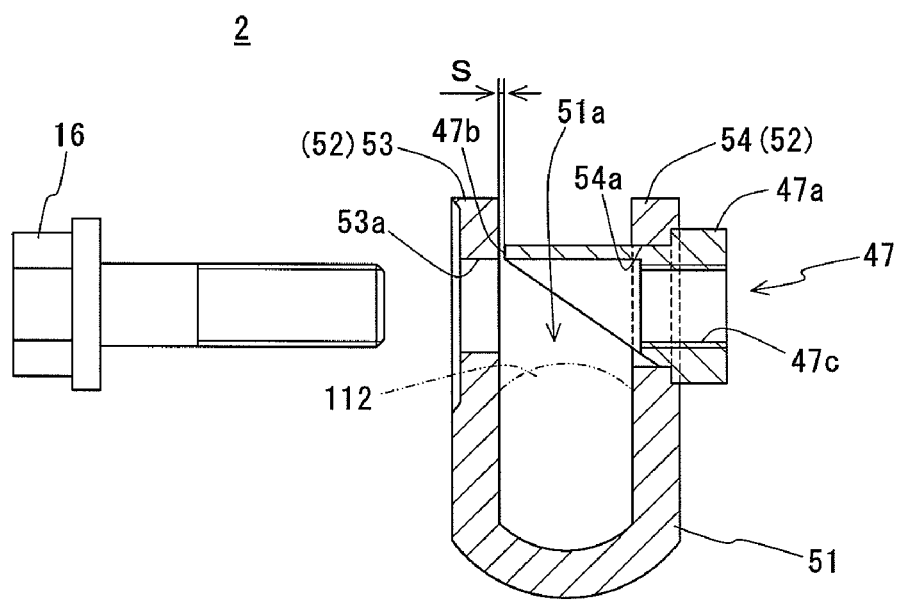
FIG. 8 is a cross-sectional view showing a schematic configuration of a yoke for universal joint according to another embodiment of the present invention.

In this case, as shown in FIG. 8, the second yoke 2 comprises a insertion portion 51 formed into a U-shape having an opening 51a which opens along the axial direction of a connected input shaft 112, the insertion portion 51 the inner circumferential surface of which comes into contact with the outer circumferential surface of the input shaft 112 when the one end side of the input shaft 112 is inserted thereinto; a pair of tightening portions 52 (a first tightening portion 53 and a second tightening portion 54) which is further extended from the insertion portion 51, and which faces each other with the opening 51a of the insertion portion 51 between them; a pair of opposed walls; and a bolt 16 and nut 47. Further, the input shaft 112 is formed to have two parallel plane surfaces at the one end side, and is inserted into the insertion portion 51 so that this two plane surfaces face the plane portions of the insertion portion 51. Furthermore, the bolt 16 is inserted into a through hole 53a of the first tightening portion 53 and the nut 47 is fitted into a through hole 54a of the second tightening portion 54. It is noted that the nut 47 has a form approximately similar to the above-mentioned nut 17 and has an enlarged-diameter portion 47a, a distal end surface 47b and a screw hole 47c.

The nuts 17, 27, 37, 47 shown in FIG. 3, FIG. 4, FIG. 6, FIG. 7, and FIG. 8 are each formed in a shape in which a part of the distal end side thereof is cut away to prevent interference with the input shaft 112. However, for example, in the case where the position of the tightening by the bolt 16 and nut 17, 27, 37, 47 is arranged away from the input shaft 112, and thereby the nut 17 does not interfere with the input shaft 112, such a cut-away shape does not need to be provided.

INDUSTRIAL APPLICABILITY

As described above, a yoke for universal joint of the present invention can be preferably applicable to a yoke with which the durability of a bolt can be increased by preventing a pair of tightening portions and a bolt from being deformed, and with which it is possible to facilitate molding, to reduce the number of molding processes, to simplifying the shape of a molding die, and to reduce the manufacturing cost.

What is claimed is:

1. A yoke for universal joint to which one end side of a rotating shaft is connected,
the yoke for universal joint, comprising:
an insertion portion formed in a U-shape or a cylindrical shape having an opening which opens along an axial direction of the connected rotating shaft, the insertion portion, an inner circumferential surface of which comes into contact with an outer circumferential surface of the rotating shaft when the one end side of the rotating shaft is inserted thereinto;
a first tightening portion and a second tightening portion being a pair of tightening portions which is extended from the insertion portion so as to face each other with the opening of the insertion portion between them; and
a bolt and nut for tightening the pair of tightening portions from either outside thereof,
the yoke for universal joint wherein:
the tightening portions are tightened by the bolt and nut, thereby, the rotating shaft inserted into the insertion portion is held and fixed;
a through hole penetrating to the facing direction of the pair of the tightening portions is co-axially formed in each of the first tightening portion and second tightening portion;
the bolt is inserted into the through hole of the first tightening portion;

the nut is fitted into the through hole of the second tightening portion so as to engage with the second tightening portion;

a part of an end surface on the side facing the first tightening portion of the nut is extended toward the first tightening portion side;

a predetermined gap is formed between the end surface of the nut and the first tightening portion before the tightening portions are tightened by the bolt and nut; and the end surface of the nut and the first tightening portion come into contact with each other when the tightening portions are tightened by the bolt and nut.

2. A yoke for universal joint to which one end side of a rotating shaft is connected, the yoke for universal joint, comprising:

an insertion portion formed in a U-shape or a cylindrical shape having an opening which opens along an axial direction of the connected rotating shaft, the insertion portion, an inner circumferential surface of which comes into contact with an outer circumferential surface of the rotating shaft when the one end side of the rotating shaft is inserted thereinto;

a first tightening portion and a second tightening portion being a pair of tightening portions which is extended from the insertion portion so as to face each other with the opening of the insertion portion between them; and a bolt and nut for tightening the pair of tightening portions from either outside thereof, the yoke for universal joint wherein:

the tightening portions are tightened by the bolt and nut, thereby, the rotating shaft inserted into the insertion portion is held and fixed;

a through hole penetrating to the facing direction of the pair of the tightening portions is co-axially formed in each of the first tightening portion and second tightening portion;

an annular contact member is fitted into the through hole of the first tightening portion so as to engage with the first tightening portion;

the nut is fitted into the through hole of the second tightening portion so as to engage with the second tightening portion;

the bolt is inserted into the contact member;

the contact member is positioned between a head of the bolt and the nut;

at least a part of an end surface on the side facing the first tightening portion of the nut is extended toward the first tightening portion side;

at least a part of an end surface on the side facing the nut of the contact member is extended toward the nut side;

a predetermined gap is formed between the end surface of the contact member and the end surface of the nut before the tightening portions are tightened by the bolt and nut; and the end surface of the contact member and the end surface of the nut come into contact with each other when the tightening portions are tightened by the bolt and nut.

* * * * *